Sept. 23, 1969 A. KACZERGINSKI 3,468,740
APPARATUS FOR PRODUCING AND ASSEMBLING COMPONENTS
OF ELECTRICAL INSULATORS
Filed Sept. 8, 1966 13 Sheets-Sheet 1

INVENTOR
ALEXANDRE KACZERGINSKI
BY Emmett F. Salter
ATTORNEY

Sept. 23, 1969   A. KACZERGINSKI   3,468,740
APPARATUS FOR PRODUCING AND ASSEMBLING COMPONENTS
OF ELECTRICAL INSULATORS
Filed Sept. 8, 1966   13 Sheets-Sheet 2

INVENTOR
ALEXANDRE KACZERGINSKI
BY Emmett F. Salter
ATTORNEY

Sept. 23, 1969　　　A. KACZERGINSKI　　　3,468,740
APPARATUS FOR PRODUCING AND ASSEMBLING COMPONENTS
OF ELECTRICAL INSULATORS
Filed Sept. 8, 1966　　　　　　　　　　　　13 Sheets-Sheet 3
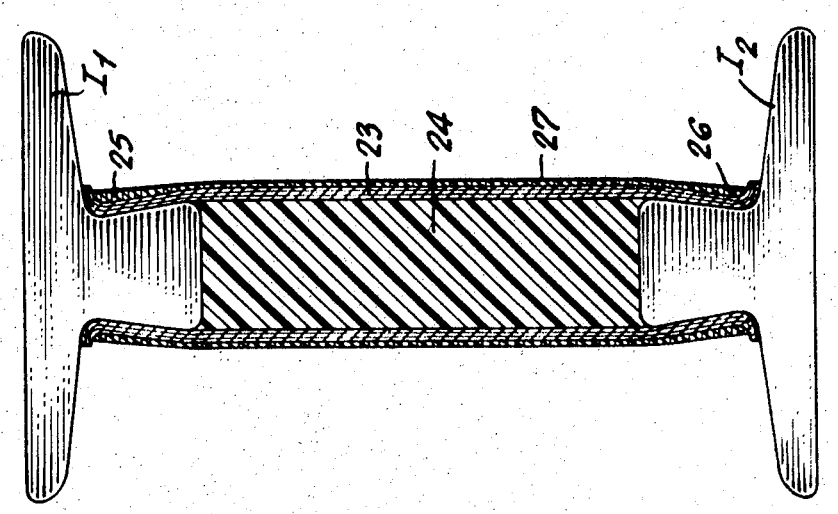
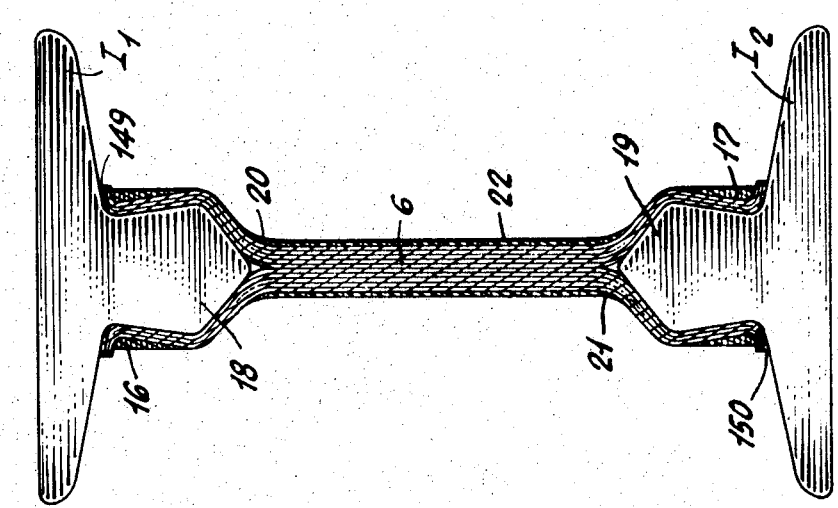
INVENTOR
ALEXANDRE KACZERGINSKI
BY
ATTORNEY

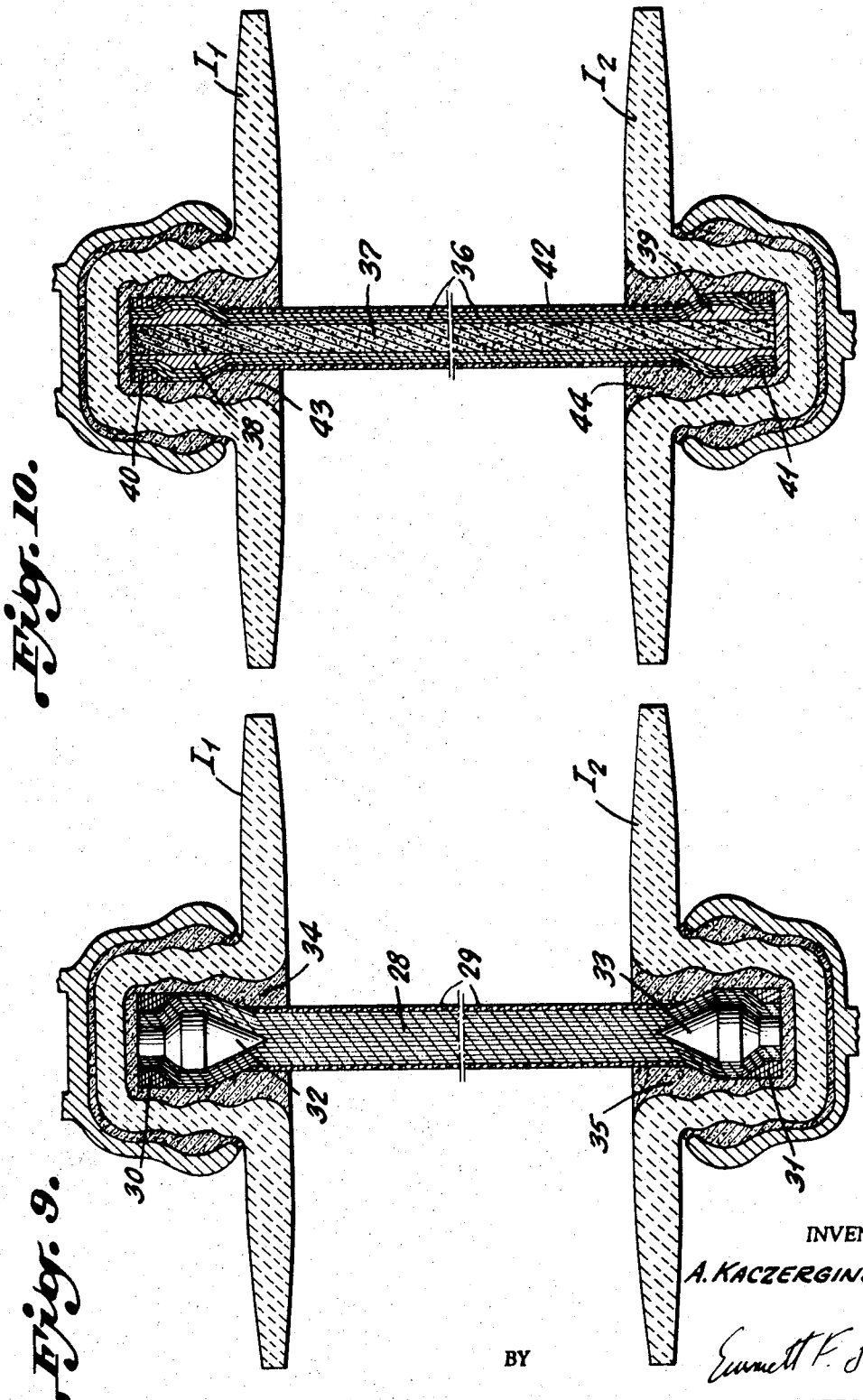

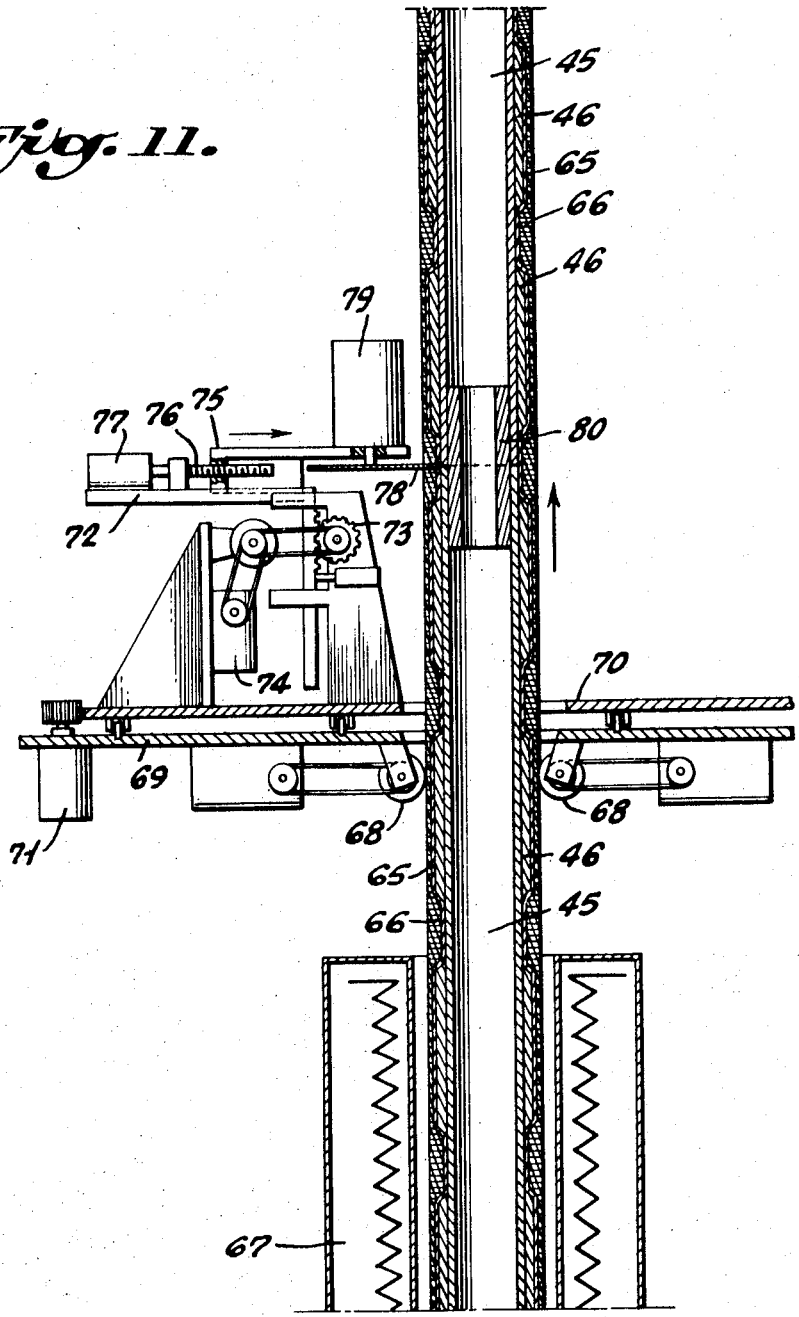

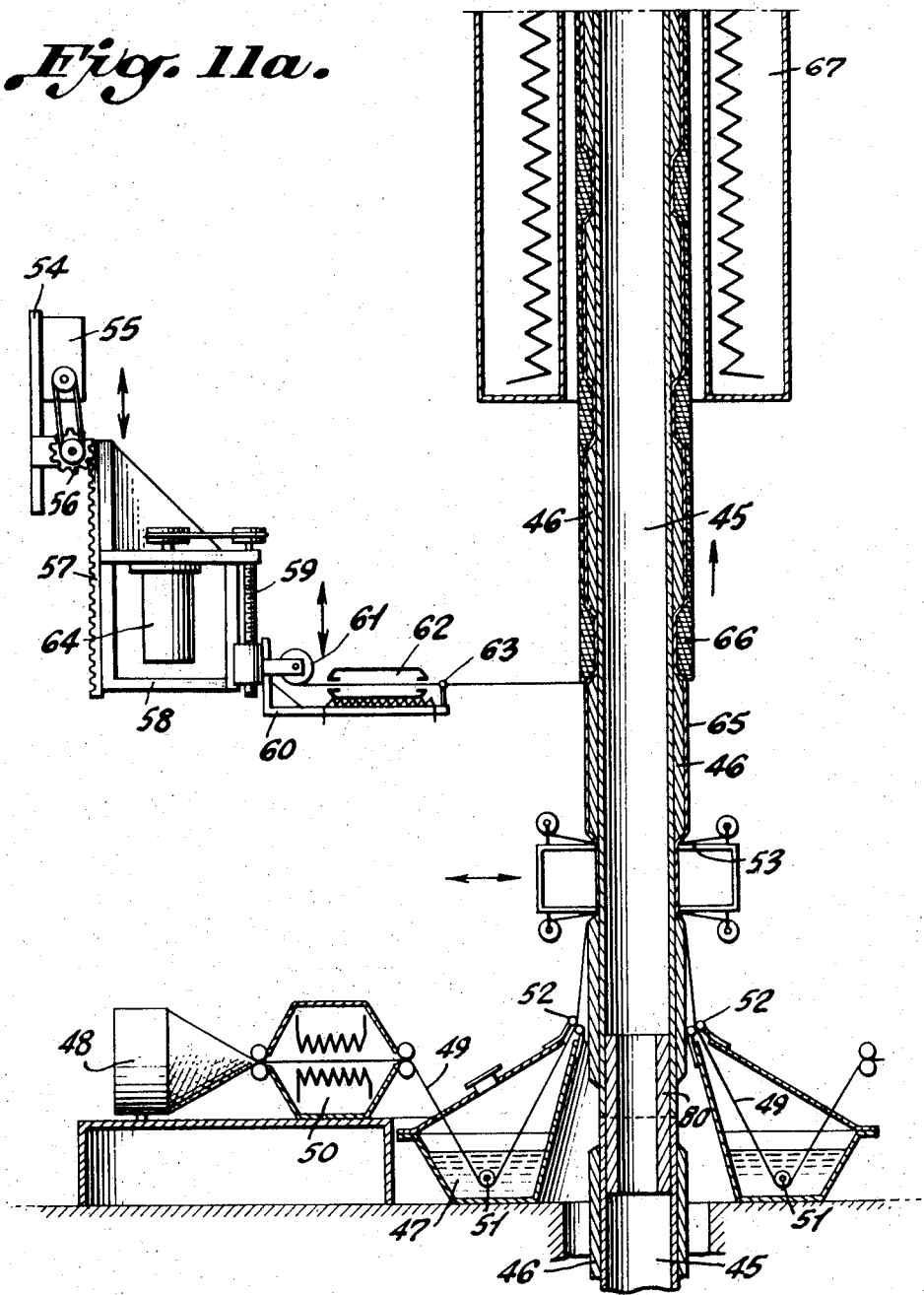

Sept. 23, 1969  A. KACZERGINSKI  3,468,740
APPARATUS FOR PRODUCING AND ASSEMBLING COMPONENTS
OF ELECTRICAL INSULATORS
Filed Sept. 8, 1966  13 Sheets-Sheet 7
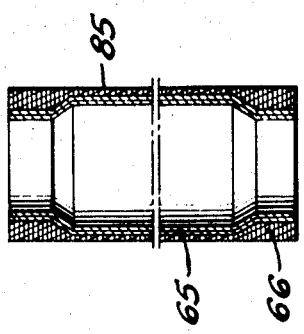
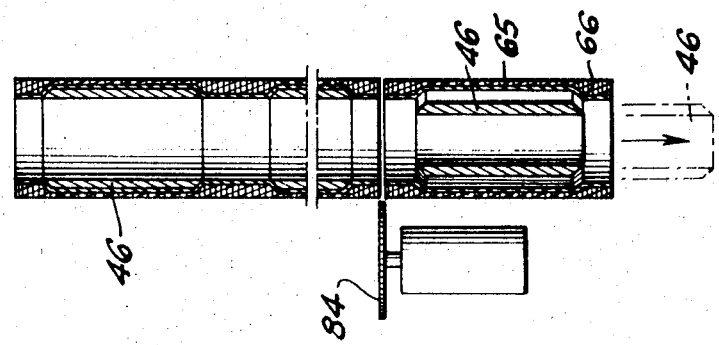
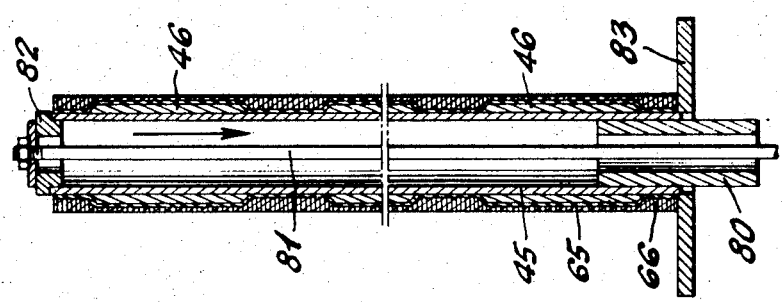
INVENTOR
ALEXANDRE KACZERGINSKI
BY *Burnett F. Salter*
ATTORNEY

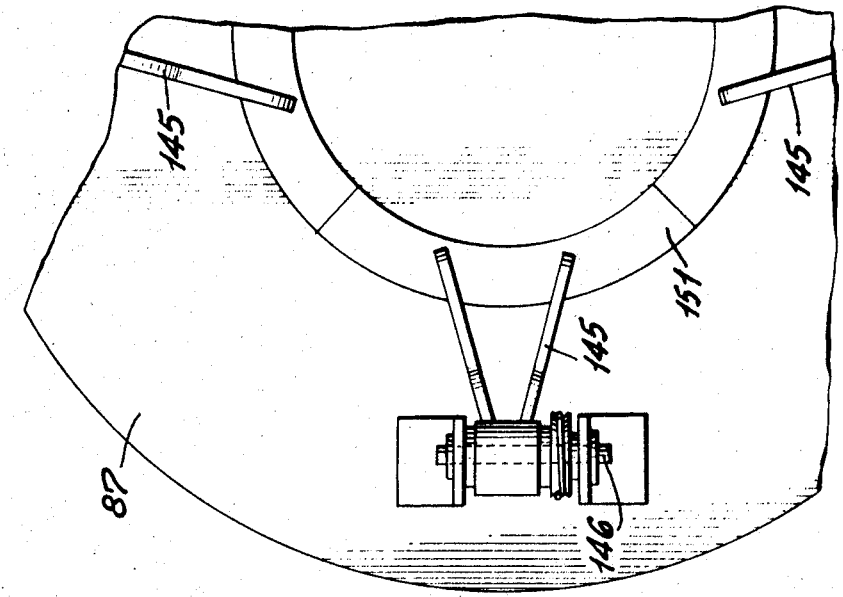
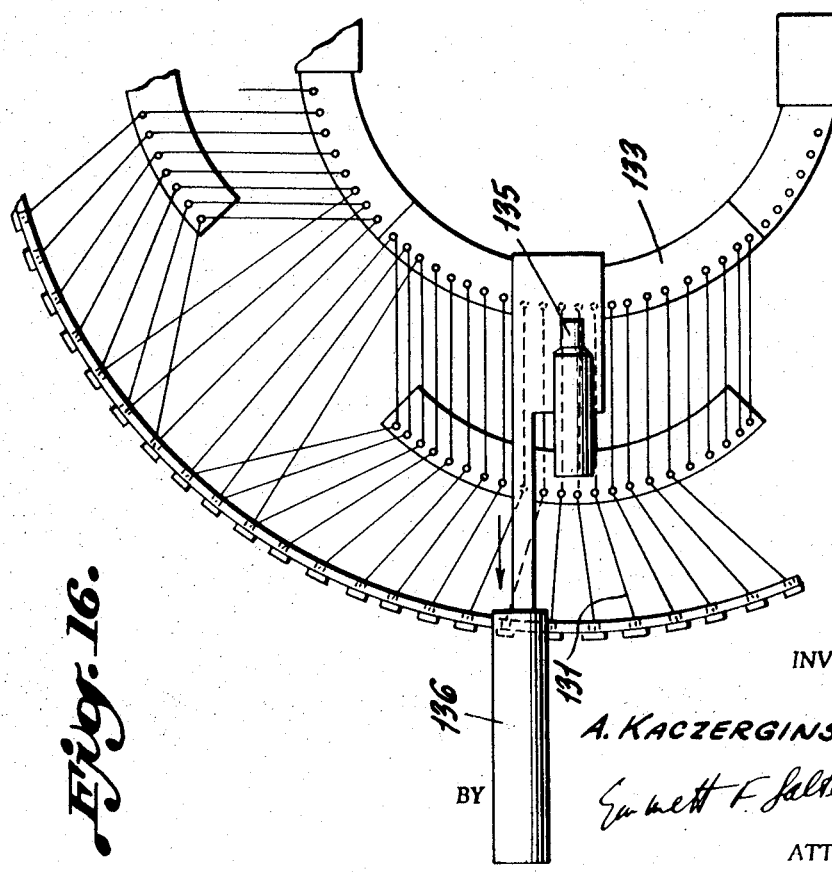

Sept. 23, 1969  A. KACZERGINSKI  3,468,740
APPARATUS FOR PRODUCING AND ASSEMBLING COMPONENTS
OF ELECTRICAL INSULATORS
Filed Sept. 8, 1966  13 Sheets-Sheet 10
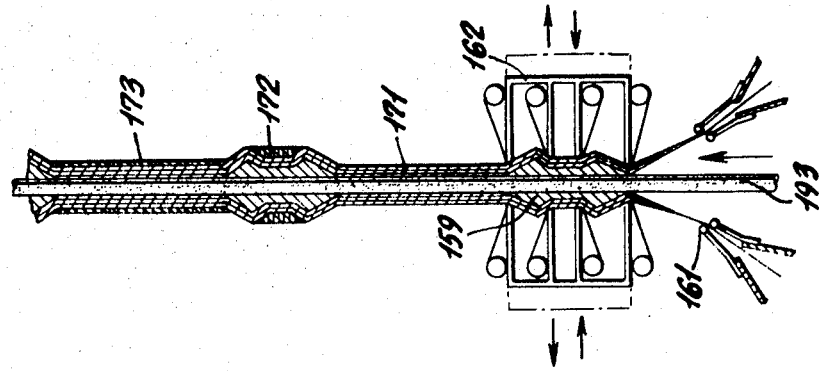
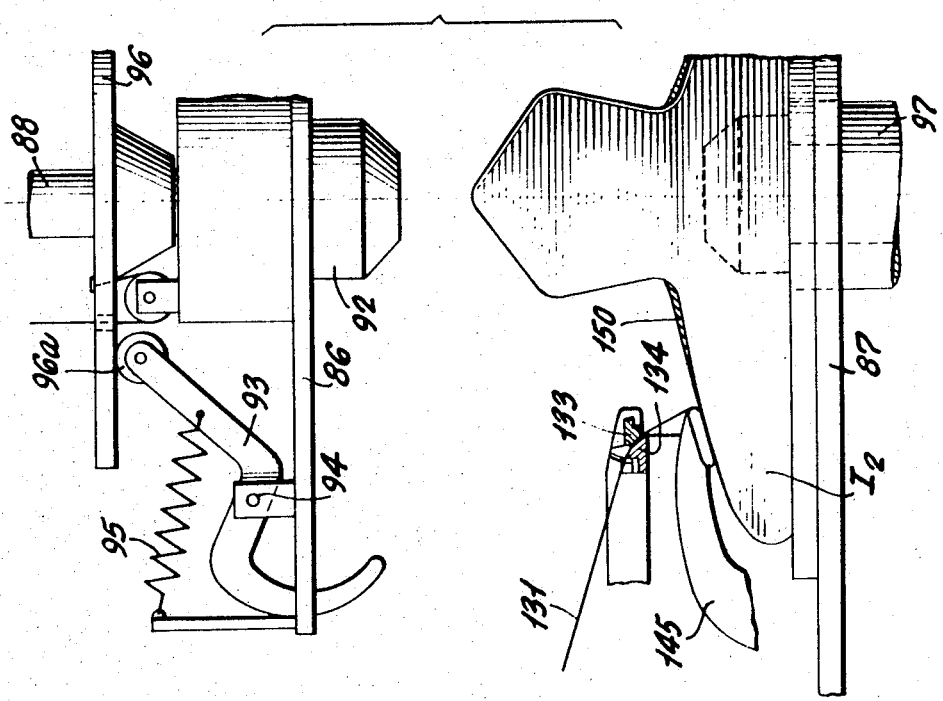
INVENTOR
ALEXANDRE KACZERGINSKI
BY
ATTORNEY

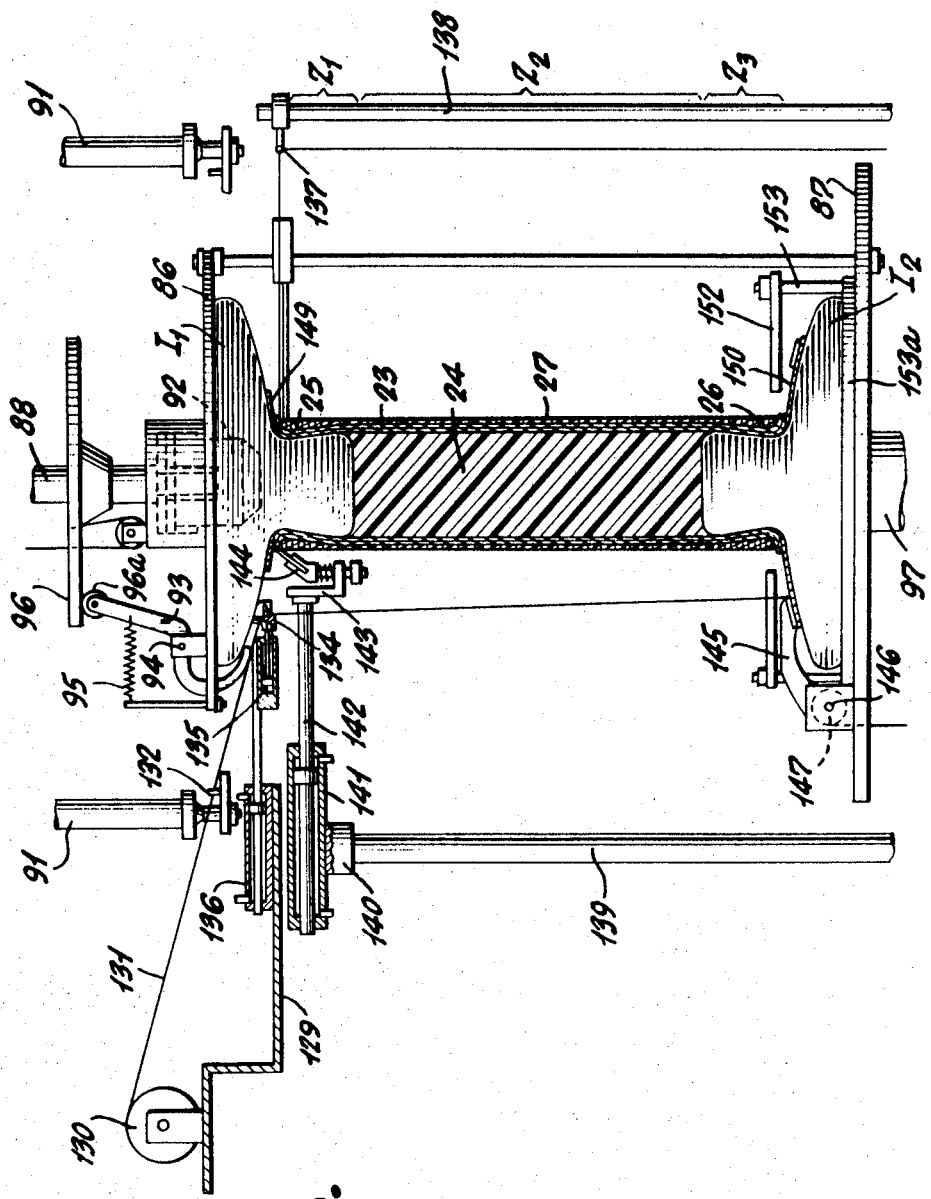

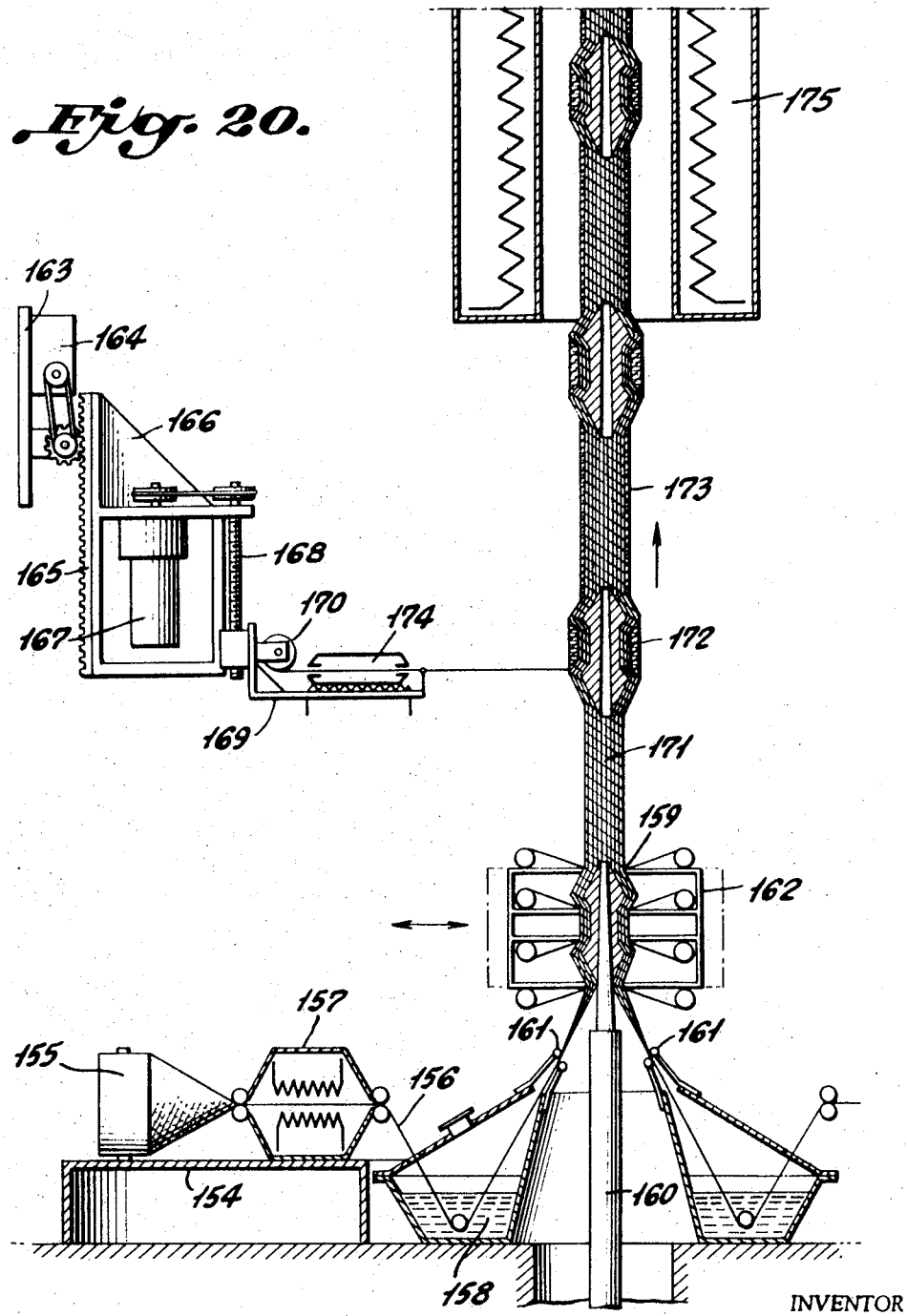

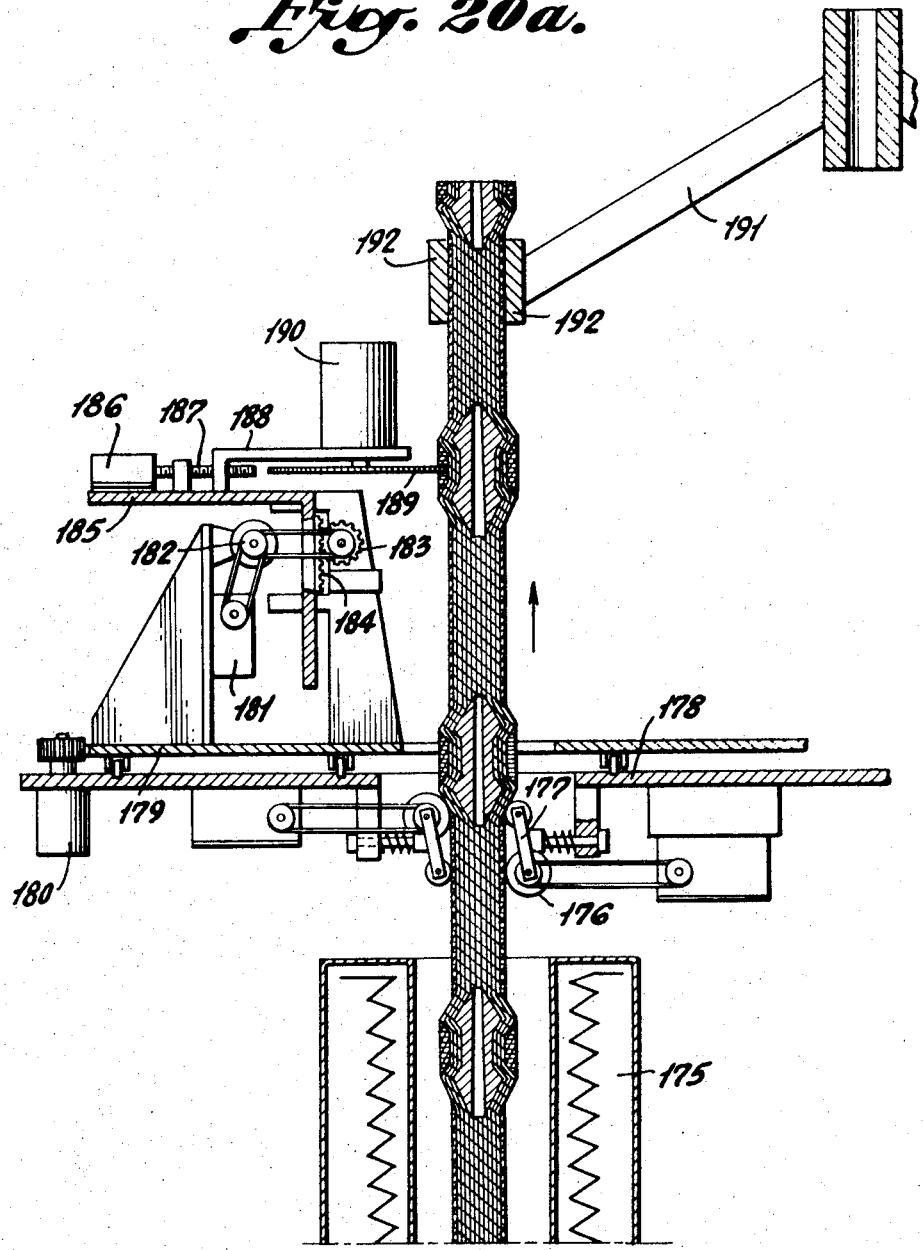

United States Patent Office 3,468,740
Patented Sept. 23, 1969

3,468,740
APPARATUS FOR PRODUCING AND ASSEMBLING COMPONENTS OF ELECTRICAL INSULATORS
Alexandre Kaczerginski, Vichy, Allier, France, assignor to Societe Europeenne d'Isolateurs en Verne Sediver, Paris, France, a corporation of France
Filed Sept. 8, 1966, Ser. No. 578,013
Claims priority, application France, Sept. 17, 1965, 31,757
Int. Cl. B29d 23/00
U.S. Cl. 156—431      44 Claims

ABSTRACT OF THE DISCLOSURE

The production of electrical insulator assemblies consisting of superposed insulator discs with central heads which are integrated by intervening rods formed of continuous parallel lengths of glass fibers impregnated with a hardenable synthetic resin, with the opposite ends of the rods either sealed within the interior, or bound to the exterior of the heads, by circumferential bindings of glass fibers also impregnated with a hardenable synthetic resin, said bindings being disposed on the ends of the rods or along the entire lengths thereof. Machinery for producing the rods in continuous lengths for subsequent attachment to the insulator discs, as well as machinery for applying the glass fibers directly to the heads of the insulator discs and forming the rods in situ, are within the purview of the present invention.

---

The present invention relates to insulator assemblies of the type disclosed in my Patent No. 3,198,878, Aug. 3, 1965, one of the characteristics of which is that their connecting elements are constituted of glass fibers and synthetic resin and comprise an exterior hooping or binding.

In the illustrative arrangement shown in the above-mentioned patent, the disc insulators are arranged in the customary fashion, below each other; the formed chain comprising from the top, the head of the insulator, then its disc, next the head of the second insulator, then its disc; etc.

The present invention is concerned with a different arrangement of the insulators which are mounted in a different way, the successive insulators being in reverse relationship to each other. The chain, thus formed, comprises, for example, the disc of the first insulator, then its head, next the head of the second insulator and its disc, then the disc and head of the third insulator, then the head and disc of the fourth insulator, etc.

In accordance with the present invention, the assembly of two insulator heads which succeed one another in the chain of insulators, is effected by means of an insulating element constituted by a double cylindrical hood formed of continuous glass fibers or filaments impregnated with organic resins, and arranged along generatrices or meridian lines situated substantially in the planes passing through the axis of the element, the assembly being hooped or bound externally at its two extremities by means of continuous glass fibers forming coils in planes perpendicular to the axis of the element, and which are likewise impregnated with organic resins.

According to another characteristic of the invention, the connection between the cavities in the heads of two successive discs in the chain of insulators is effected by means of an element consisting of a rod formed of continuous glass fibers impregnated with organic resins and arranged substantially parallel to the axis of the rod, this rod being hooped by continuous glass fibers forming coils in the planes perpendicular to said axis, and which are also impregnated with organic resins.

The elements consisting of the double hoods and rods may be formed in place on the components to be assembled, the glass fibers being then impregnated with resins in a second phase before their utilization. They may also be formed separately.

It is also the object of the invention to provide suitable apparatus for producing the above-mentioned double hoods and rods and the insulator assemblies formed therewith.

Other characteristics and advantages of the invention will appear in the description which follows of different illustrative embodiments, in conjunction with the annexed drawings, wherein FIGS. 1 and 2 are schematic diagrams illustrating the arrangements of the insulator discs for the formation of a chain assembly of insulators;

FIGS. 7 and 8 are sectional views of two different embodiments of double hood constructions, on an enlarged scale;

FIGS. 9 and 10 are enlarged sectional views of two different embodiments of rod constructions;

Figure 15:
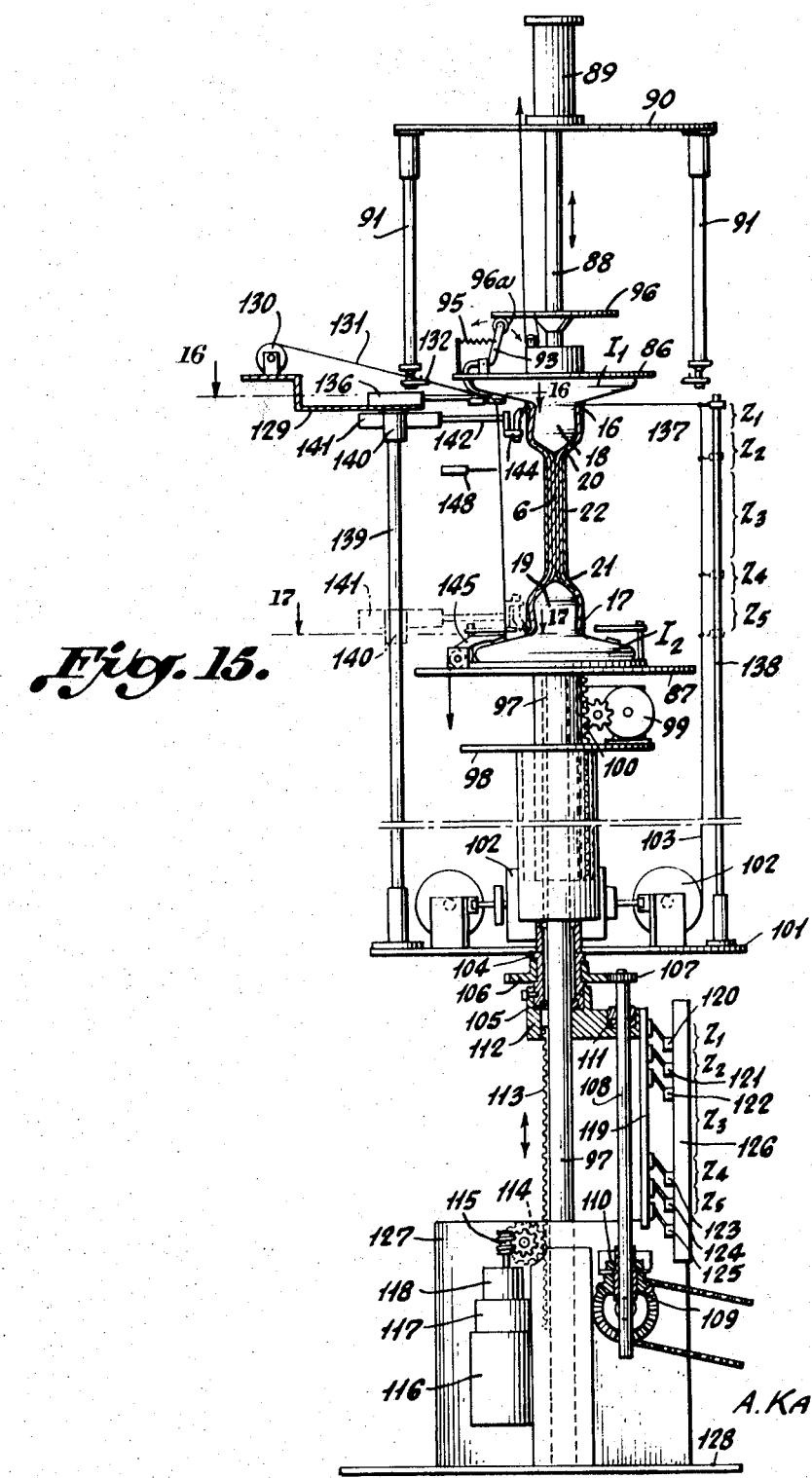

FIGS. 11 and 11a, in superposed relation, illustrate schematically, with some parts in elevation and some in section, an apparatus for producing continuously the double hoods in accordance with the invention;

FIG. 12 is a vertical sectional view of the device for stripping the mandrel from the double hoods following the completion of the formation of the latter;

FIG. 13 is a vertical sectional view of the apparatus for obtaining the individual double-hoods from the section which has been freed from the mandrel, and for separating the extensible sleeves from the interior thereof;

FIG. 14 is a sectional view of a finished double hood;

FIG. 15 is a front elevation, with certain parts in section, of an apparatus for applying in situ the double hoods to the insulator discs, of the type shown in FIG. 7;

FIG. 16 is a horizontal sectional view of a portion of FIG. 15 on an enlarged scale along line 16—16 thereof;

FIG. 17 is a horizontal sectional view of a portion of FIG. 15 on an enlarged scale along line 17—17 thereof;

FIG. 18 is a front elevation, with certain parts in section, of a portion of the machine shown in FIG. 15, showing the positions of the tables for supporting the insulator discs, on an enlarged scale, at the beginning of the hood applying operation;

FIG. 19 is a front elevation of a portion of the machine shown in FIG. 15, on an enlarged scale, and arranged to apply in situ a variant of the double hood, corresponding to that shown in FIG. 8;

FIGS. 20 and 20a, in superposed relation, illustrate schematically, with some parts in elevation and some in section, an apparatus for producing continuously, the rods between the pairs of insulators as shown in the assembly in FIG. 9; and FIG. 21 is a view of a portion of a variant of the machine shown in FIGS. 20 and 20a for producing continuously rods of the type shown in FIG. 10.

Figure 1:
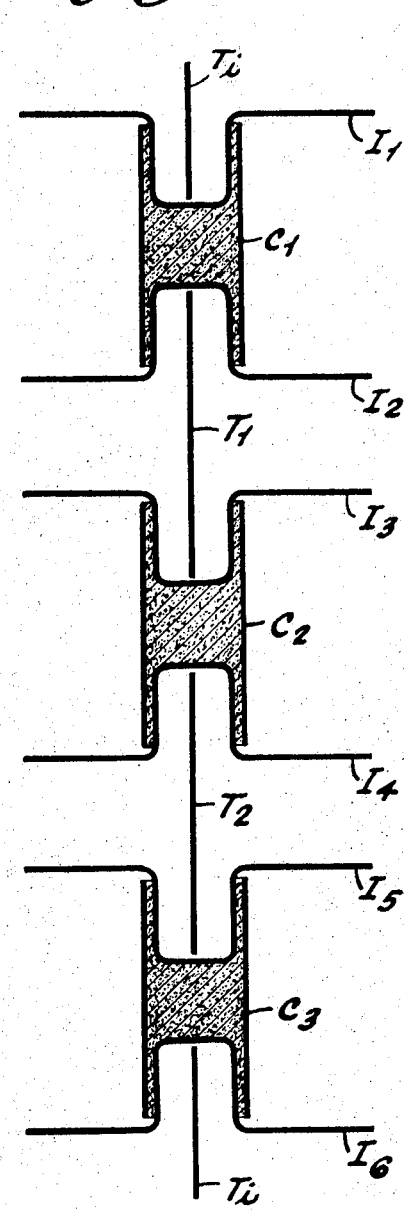

In FIG. 1 is shown a chain of insulators which comprises six elements $I_1$, $I_2$, $I_3$, $I_4$, $I_5$ and $I_6$ with three cylindrical double-hoods $C_1$, $C_2$ and $C_3$ joining respectively the heads of elements $I_1$ and $I_2$, $I_3$ and $I_4$, and $I_5$ and $I_6$. Also, two double rods $T_1$, $T_2$ join the cavities or hollow parts of the heads of discs of elements $I_2$ and $I_3$, and $I_4$ and $I_5$, respectively. The hollow parts of the heads of the end elements $I_1$ and $I_6$ are equipped with rods $T_i$ which may be insulating or metallic. These rods have, at their free or unsealed ends, a projection, a cope or an eyelet.

Figure 2:
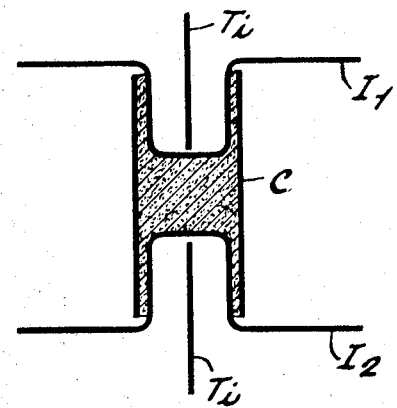

As shown in FIG. 2, flexible chains may also be attained by elements each comprising two insulators $I_1$, $I_2$ connected by a double-hood C and each fitted at their extremities with a rod $T_1$, which may be insulating or metallic. Each of these rods may be equipped at its free extremity with either a projection, to which two successive insulators are joined by means of a double ball and socket, or one with an eyelet and the other with a cope assembled by means of a bolt or iron pin.

Figure 3:
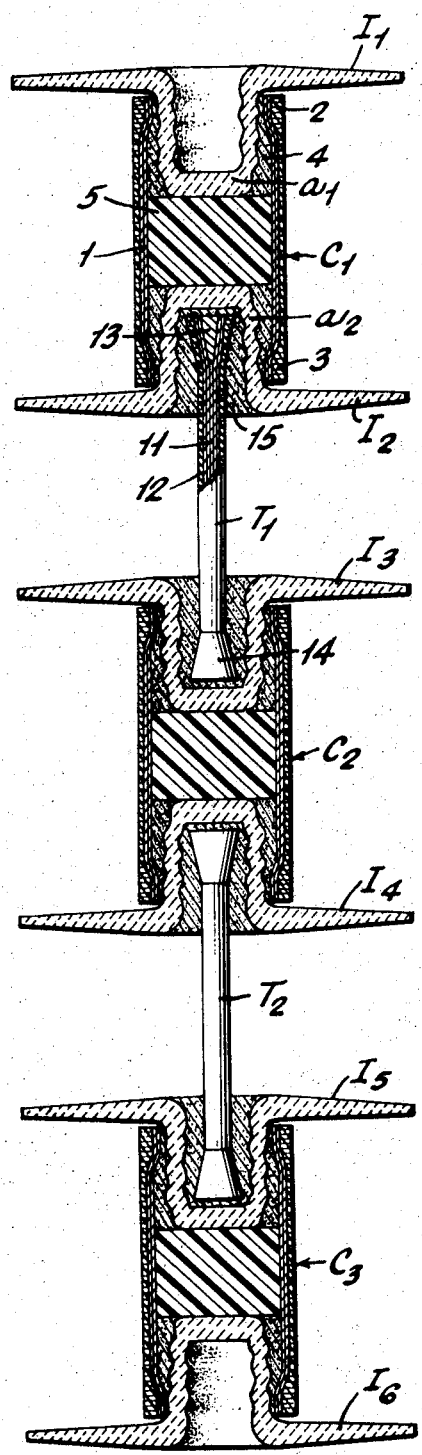
FIG. 3 is a sectional view of the insulator chain shown schematically in FIG. 1.
Figure 4:
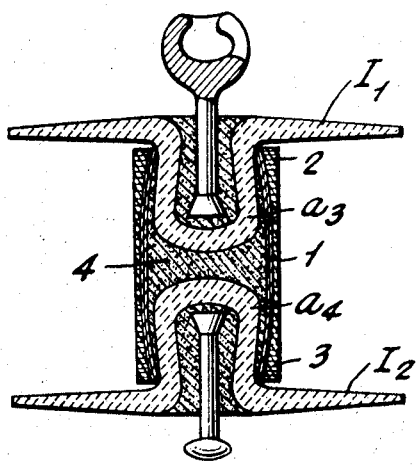

As shown in FIGS. 3 and 4, the double hoods constituting the connecting elements between successive insulator heads $a_1$, $a_2$ comprise an interior cylindrical part 1 formed of continuous glass fibers covered with synthetic resin, these fibers being advantageously arranged along the meridian lines of the element. They also comprise bindings or hoopings 2 and 3 wound around the fixation zones of the double hood with the heads $a_1$, $a_2$ of the insulators. These hoopings are formed of continuous glass fibers wound under tension and impregnated with synthetic resin.

The inner cylindrical part 1 of the double hood has the effect of imparting to the connecting element a high resistance to traction, and the exterior bindings themselves assure suitable linking between the element and the insulator heads.

Since synthetic resins are capable of being utilized for the impregnation of glass fibers, one may cite, without this enumeration being limitative, the polyester resins, the epoxy or ethoxyline resins, for example, the resins known commercially under the name of "Araldite," the silicone resins, as well as the phenoplastics and aminoplastics.

FIG. 4 illustrates an arrangement of a double hood for linking two insulators whose heads $a_3$ and $a_4$ are smooth instead of being grooved.

In the arrangement described above, the double hoods are formed completely before being put in place on the heads of the insulators. Their assembly with the insulating elements is obtained by means of classic or conventional seals 4. A filler mass 5 of insulating material may be provided between two successive heads, especially if the distance which separates them is large, as is the case with the embodiment shown in FIG. 3.

Figure 6:
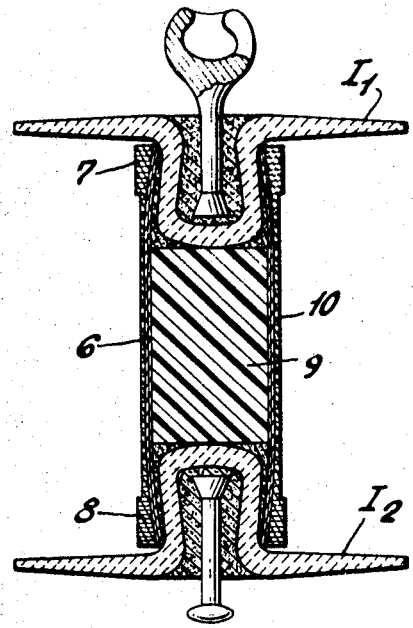
FIGS. 4 to 6 are sectional views of different embodiments of the disc, hood and rod assembly shown schematically in FIG. 2.
Figure 5:
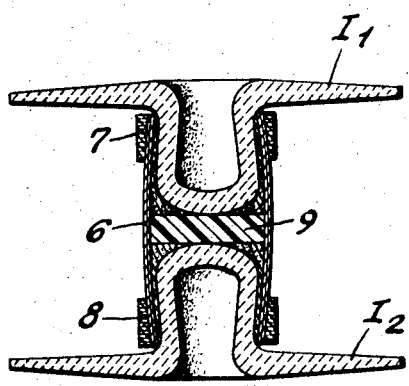

In the embodiments shown in FIGS. 5 and 6, the heads of the successive insulators are joined by the double hoods constituted, like the preceding ones, in part by a cylindrical part 6 formed of continuous glass fibers covered with synthetic resin and advantageously arranged along meridian lines, and in part by bindings 7 and 8 of continuous glass fibers impregnated with synthetic resin and wound under tension. In contradistinction to the preceding arrangements, these double hoods are constructed in place on the insulator heads.

An insulating material 9 may be provided internally of the double hoods between the insulator heads.

As FIG. 5 shows, the hooping can be limited to the two extremities of the double hood. Also, as in the arrangements described above and as shown in FIG. 6, these two hoopings can be joined by a part 10 formed of one of several layers wound around the inner cylindrical body 6.

In the arrangement shown in FIG. 3, the connection between two cavities of two successive discs of the chain of insulators is effected by means of a rod $T_1$ formed by a core 11 of continuous glass fibers impregnated with synthetic resin arranged parallel to the axis of the rod and by a hooping 12 forming coils in the planes perpendicular to said axis, this hooping being also constituted by continuous glass fibers impregnated with synthetic resin. The rods have an enlargement 14 at each of their ends which is formed by an internal wedge 13. The fastening of the rods in the cavities of the discs is realized by means of a mass of sealing material 15. The enlargements serve the purpose of maintaining the rods in the cavities without the possibility of slipping along their axis.

The preceding figures illustrate schematically and structurally the disposition of the double hoods and the rods. FIGS. 7 and 8 show other forms of execution of the double hoods.

In FIG. 7, the successive discs $I_1$ and $I_2$ are attached to one another by a double hood formed by a bundle of longitudinal fibers 6 and by hoopings of circumferential fibers 16 and 17, enclosing the heads 18, 19, respectively, of the insulators. Bindings 20 and 21 enclose the bundle of longitudinal fibers 6 above and below said heads. The hoopings 20, 21 may be connected to one another by a winding of fibers 22, surrounding the bundle of fibers 6.

In the variant shown in FIG. 8, the bundle of longitudinal fibers 23 forms a hollow cylinder, the empty space inside being filled with a filler material 24. The binding is attained by means of circumferential fibers 25 and 26 surrounding the insulator heads, these bindings continuing through a part 27 over the entire height separating these bindings.

FIGS. 9 and 10 illustrate two embodiments of rods which assure a reliable connection between the cavities of two successive insulator discs.

In the form of execution shown in FIG. 9, the rod is made up of a bundle of longitudinal fibers 28 compressed into a form of a baton or stick, a bundle of circumferential fibers 29 surrounding the body of the rod, and two ends bindings 30 and 31. The latter encompass the necks of the cores 32 and 33 which are inserted into the ends of the mass of the bundle of longitudinal fibers. These two extremities of the rod are sealed in the cavities of the insulator heads by sealings 34 and 35.

In the embodiment shown in FIG. 10, the bundle of longitudinal fibers 36 is hollow and surrounds a cylindrical core 37 of insulating material. At each extremity is provided a hollow core 38, 39, the necks of which are encompassed by bindings of circumferential fibers 40 and 41, respectively. As in the preceding embodiment, a binding 42 of circumferential fibers extends over the entire length of bundle 36 between the cores. The assembly is fastened in the cavities of the insulator heads by masses of sealing material 43, 44.

The interior cylindrical core 37 may be a destructible core which is used at the time of manufacture of the rod. Upon the removal of this core, a mass of filler material may be run into the space which was occupied thereby.

Now there will be described apparatus for the production of double hoods, both continuously and independently of the insulators, or directly on the latter, and also apparatus for the continuous production of connecting rods, which also are in the purview of the instant invention.

(A) Apparatus for producing double hoods continuously, independently of the insulators An apparatus for producing continuous double hoods independently of the insulators is shown in FIGS. 11 and 11a. This production is executed continuously on a vertical assembly of mandrels 45 which are interconnected by internal sleeves 80 and on the exterior of which are arranged extensible sleeves 46. This assembly of mandrels fitted with the spaced sleeves is disposed along the axis of an annular chamber or reservoir 47 containing an impregnating resin. A plurality of spools or bobbins 48 are arranged uniformly around this chamber for delivering continuous glass fibers 49 which pass into ovens or warming chambers 50 before the fibers are immersed in the resin contained in chamber 47. These fibers are guided by rollers 51 and an assembly of combs and rings 52, and assume a vertical direction to come into contact with the first sleeve. The assembly of these glass fibers impregnated with resin is designed to form the bundle of longitudinal fibers of the double hoods.

After application of the longitudinal bundle of fibers on a sleeve, the bundle is bound or tied between two sleeves at the extremities of the latter, by a device delivering threads 53, this device being mounted so as to be able to approach or draw away from the axis of the mandrels in order to allow continuous forward movement of said mandrels.

Above the fastening device is provided the device permitting the execution of the hoopings or bindings. This device comprises a support 54 turning about the axis of the mandrels. On this support is mounted a reversible motor 55 which entrains a rack 57 by means of pinion 56. The rack, in its up and down vertical translating movement, carries along a support 58 on which is mounted a motor 64 which actuates a screw 59 for controlling the travel of a carriage 60. This carriage carries a spool of glass fibers 61 as well as a container 62 containing the resin and a guide 63 across which the fibers pass.

This arrangement allows, through rotation of support 54 and vertical displacement of the carriage, the obtention of the circumferential hooping between successive sleeves during the advance of the sleeve assembly. In addition, two winding speeds are employed, one rapid, for filling the gaps between the sleeves, and the other slow, to form the hooping over the height of the sleeves.

The sleeves, thus provided with longitudinal fibers 65 and circumferential hoopings 66, pass through a polymerization oven 67.

Above the oven (FIG. 11) are moving rollers 68 which effect the advance of the assembly of mandrels and sleeves.

These rollers are arranged below a table 69 on which turns a table 70, actuated by motor 71, around the axis of the mandrels. The table 70 supports the cut-off device for tubes which are produced. This cutting device comprises a support 72, which is actuated by gears 73 and motor 74, so as to communicate thereto a vertical translating movement to accompany the tube assembly at the moment of cutting. It also comprises a carriage 75 mounted on support 72, and the movement of the carriage is controlled by screw 76 and motor 77. The carriage supports a rotary saw 78 which is driven by a motor 79.

This arrangement permits the realization of an advance of the saw equal to that of the mandrels, the disengagement of the saw after the cutting operation, and its return to the starting point by a rapid reverse movement.

The cutting having been executed directly at a coupling sleeve 80 between two mandrels, the detached assembly is brought to the position for extracting the tubes. The transfer may be effected directly or after molding, in a mold of two parts for the exterior surface of the tubes.

As shown in FIG. 12, the extraction of the mandrel is obtained by means of a stay rod 81 acting on a head 82 resting on the mandrel, the tubes and their sleeves being checked by a rim 83.

The following operation (FIG. 13), is designed to cut the double hoods and to extract the extensible sleeves. The cutting is effected by means of a saw or cutting wheel 84 and the extraction of the sleeves is obtained by retracting them. In order to permit this operation, the sleeves may be constituted of retractable and demountable elements, or the sleeves may be molded of deformable or flexible material.

The mandrels 45 which have been removed are put back in place at the lower part of the apparatus shown in FIG. 11a by means of connecting sleeves 80.

By the above-described procedure, the double hoods are obtained such as are shown in FIG. 14, with longitudinal fibers 65, circumferential end bindings 66, and a circumferential layer of fibers 85 between the end bindings.

(B) Apparatus for producing double hoods directly on the insulator discs

An apparatus for producing double hoods and applying such in situ directly onto the insulator discs is illustrated in FIGS. 15 to 19.

As shown in FIG. 15, this device comprises two support-tables 86 and 87 for the upper insulator $I_1$ and lower insulator $I_2$, respectively, before being joined by a double hood. Table 86 is integral with rod 88 of jack 89 fastened on a plate 90 which is mounted by columns 91 on the stationary frame. Along the axis of rod 88 is placed a center pin 92 (FIGS. 18, 19), which is designed to assure the centering of the insulator set in place on table 86. Fastening of the insulator is accomplished by means of four fingers 93, each pivotally joined to the table at 94, and subjected to the action of springs 95, tending to enforce their grasping of the insulator. Their disengagement is effected by means of rollers 96a in contact with a disc 96 capable of moving on the rod of jack 88.

Table 87 is mounted on a shaft 97 passing through fixed plate 98 on which is placed a motor-reducer 99 in mesh with a rack bar 100 to effect vertical displacement of shaft 97 (FIG. 15).

Concentric with shaft 97 is arranged a table 101 carrying spools 102 which may be four in number in the illustrated embodiment. These spools deliver glass fibers 103 to produce windings of circumferential fibers. This table is mounted on a hub 104 on bearing 105. A gear 106 is fixed to hub 104, which meshes with pinion 107 integrally mounted on a shaft 108 which extends parallel to shaft 97, and which is rotated by means of conic screw-gears 109. Shaft 108 turns in two bearings 110 and 111, bearing 110 being fastened to a fixed part and bearing 111 being mounted on a part 112 which is guided by shaft 97. A translating movement parallel to shaft 97 is imparted to part 112 by a gear rack 113 mounted on shaft 97 by a long key. The rack 113 is engaged by a pinion 114 meshing with a pinion gear which is actuated by the rotary motion derived from a motor 116 through the intermediary of a reversing clutch-brake 117 and a reducer 118.

A rod 119 is fastened on movable part 112 and embossings on the former control micro-contacts 120, 121, 122, 123, 124 and 125 fixedly mounted on a stationary standard 126, and which act on the motor 116 to derive a variable speed under the control of rack 113.

Shaft 97 as well as motor assembly 116–118 and standard 126 are fixedly mounted relative to each other on a frame 127 mounted on foundation 128.

On a circular plate 129 concentric to the axis of the apparatus are mounted spools 130 for delivering glass fibers to produce the long bundle of fibers 6 of the double hood. These fibers pass into a stationary comb 132 on the lower part of fixed columns 91. They next pass between elements 133, 134 of a circular pincers which are controlled by micro-jacks 135. This assembly of pincers whose elements are in the form of segments of circles (FIG. 16), is carried by circular plate 129. Withdrawal of the assembly outwardly is effected by hydraulic jacks 136 also mounted on this circular plate 129. At the time of forming the long bundle of fibers 6, the pincers are unclamped, while during change of insulators and their placement in position, as well as during the cutting operation by means of cutting wheel 144, said pincers are clamped and hold the fibers.

To attain the circumferential hoopings, the fibers emanating from the four spools 102 pass into eyelets 137 mounted on rods 138 parallel to shaft 97 and integral with rotating table 101.

Columns 139 are also mounted on the rotating table 101. These columns, which are disposed in parallel to shaft 97, have a sleeve 140 supporting a jack 141 whose rod 142 is integral with a mounting 143 carrying a cutting wheel 144 (FIGS. 15, 19). This mounting can move back and forth on the supporting rod so as to cut off the glass fibers successively at the upper part, below insulator $I_1$, then at the lower part, above insulator $I_2$, by sleeve 140 descending along the length of its column.

On lower table 87, fingers 145 are pivotably mounted at 146 and are subjected to the action of springs 147.

These fingers are designed to assure clamping of the fibers on the insulator by means of sectors 151 (FIG. 17); they are lowered at the time the insulator is removed.

The device comprises also a diaphragm 148 (FIG. 15) designed to encompass the glass fibers and to form a rod therefrom.

Finally, and prior to formation of the double hood, small discs 149 and 150 which are designed to protect the material of said insulators at the time of cutting, are placed at the neck or junction of the heads and discs of the insulators (FIGS. 7, 18 and 19).

In order to permit the placement of a mold around the completed double hood, a restraining block 152 may be provided on table 87, which is attached to the table by small posts 153.

The apparatus described above operates as follows:

The two tables 86 and 87 are raised to high position by means of jack 89 and rack bar 113, respectively. The two tables take the position shown in FIG. 18. Lower insulator $I_2$ is put in place, the glass fibers 131 remaining suspended following their cutting after formation of the preceding double hood, and are held by the blocking sectors 151 which are pressed down by fingers 145 and are kept applied on the insulator, pincers 133, 134 being previously closed.

The lower support table 87 is next lowered by the action of gear rack 113. The upper insulator $I_1$, is put in place on table 86, fingers 93 remaining open. These fingers are lowered and when table 87 descends, the two tables 86, 87 then occupy the position shown in FIG. 15. The fibers from spools 130 are released by open pincers 133, 134 and form a cylinder which is encompassed by diaphragm 148 to form a rod. Next are formed the end bindings or hoopings for the elongated bundle of fibers which has been compressed into the form of a rod.

After formation of this long bundle, winding of the circumferential fibers is executed by rotation of table 101 and vertical displacements of thread-guides 137 with simultaneous rotation of the latter. The speeds of vertical translation of the thread-guides, which should be different according to the winding to be effected, are regulated at $Z_1$, $Z_2$, $Z_3$, $Z_4$ and $Z_5$, respectively, by micro-contacts 120, 121, 122, 123, 124 and 125.

Next, the cutting of the bundle of longitudinal fibers is executed, on the one hand, at the upper part, by small cutting wheel 144 occupying the position shown in solid lines in FIG. 15, and on the other hand, at the lower part, by this same cutting wheel occupying the position shown in dotted lines in this figure.

After cutting, the pincer and cutting devices are moved outwardly to permit the placement of a two-part mold on the double plate 153a (FIG. 19), which is attached by clamps 152. One then proceeds with the impregnation of the body of the double hood with resin by flowing in the resin naturally, or even more by impregnation of the body with resin under vacuum, with or without pressure. Hardening or polymerization takes place by heating the mold or placing it in an oven. After hardening and cooling, the finished hood and rod is taken from the mold.

In the variant shown in FIG. 19, an insulating filler material 24 is placed between the heads of the insulators. The device is identical to the one just described. However, since the double hood has only two end hoopings 25, 26 joined by a hooping 27, only three speeds are provided for the thread-guides 137 which are controlled at $Z_1$, $Z_2$ and $Z_3$ by three micro-contacts.

(C) Apparatus for the continuous production of rods

FIGS. 20, 20a and 21 show an apparatus for the continuous production of rods of the type shown in FIGS. 9 and 10.

The device shown in FIG. 20 comprises a circular table 154 on which spools 155 are mounted, each one delivering a continuous glass fiber 156 through ovens 157 and vats of resin 158 through which the fibers pass. Upon their exit, the fibers are adapted to produce the elongated bundle by passing through combs and rings 161 followed by their guiding over a core 159 which is held in centered position by a pusher or driver 160.

A diaphragm device 162 permits tying the longitudinal fibers at the extremities of the cavities of core 159. The device is actuated both axially and transversely and these displacements are synchronized with the advance of the cores and fibers.

The assembly formed by the long fibers 171 tied onto the core, then passes in front of the device for effecting circumferential hooping. This device comprises a rotating table 163 turning about the axis of the assembly. A motor 164 is provided on this table which actuates a gear rack 165 attached to support 166 on which is mounted a variable speed motor 167 which in turn operates a screw 168. This screw imparts a vertical translating movement to a carriage 169 which carries thereon a spool of fibers 170 which is adapted to form circumferential hooping of the rods after the fibers pass through an oven 174.

Rotation of table 163, combined with the vertical movements of translation at varied speeds of carriage 169 permits obtaining: (1) hooping 172 on the throat of the core, the carriage being activated by a rapid back-and-forth movement; (2) winding 173 on the length of the rod of fibers between the two cores; and (3) the possible absence of winding on the conical parts of the core, if the carriage moves at high speed at that time.

The assembly next passes into a polymerization oven 175 to effect hardening of the resin.

As shown in FIG. 20a, the motion-advancing rollers 176 are carried by swing-bars 177 which are mounted resiliently on a support 178, in order to allow the passage of the rod assembly including the enlargements occasioned by the cores.

A rotary table 179 is mounted on support 178 in such a way as to render it rotatable about the axis of the rods by means of motor 180 on the support 178. A motor 181 carried by table 179 actuates a pinion 183 through a transmission 182, and the pinion 183 meshes with a gear-rack 184 integral with a support 185, which executes an alternating longitudinal vertical movement in synchronism with the advance of the rods. A motor 186 mounted on the support 185 controls a carriage 188 through the intermediary of a screw 187, and a cutting disc 189 is mounted on the carriage 188 together with its operating motor 190.

The transverse movement of carriage 188 effects the penetration of the saw through the throat of the core. These longitudinal and transverse movements permit a forward advance equal to that of the rods, the disengagement of the saw, and the rapid return thereof to the starting point.

During their cutting, the pieces are supported by a bracket 191 provided with jaws 192. This bracket also allows the transfer of pieces on the stock tables. Thus are obtained insulator connecting rods having solid shafts of the type shown in FIG. 9.

According to the variant shown in FIG. 21, a cylindrical core 193 of insulating material is utilized, forming a mandrel. This variant makes possible the obtention of rods with cylindrical cores of the type shown in FIG. 10.

If the cylindrical core 193 is of solid material which is either soluble or meltable, onto which is fitted the cores 159, the same may be eliminated by dissolution or heat and the interior of the rods may be filled with a mass of insulating material.

According to another variant, a hollow mandrel may be used for supporting the cores 159, which is removed after the formation of the rod. The empty interior left by this mandrel is then filled with a mass of insulating material.

I claim:

1. An apparatus for producing cylindrical double-hooded connecting members for electric insulator assemblies comprising;
    (a) a vertically movable hollow cylindrical mandrel,
    (b) a plurality of deformable sleeves mounted on the exterior of said mandrel in spaced relation from each other,
    (c) means for continuously advancing said mandrel upwardly past a plurality of stations in superposed relation,
    (d) means at the lowermost station for guiding a plurality of resin-impregnated glass fibers onto the outer wall of said mandrel for upward travel therewith in the form of a cylindrical bundle of elongate fibers extending in substantial parallelism to the axis of said mandrel and distributed around said outer wall,
    (e) means at a second and higher station for widing a large number of turns of resin-impregnated glass fibers around said bundle of elongate fibers between said sleeves and a lesser number of turns around said bundle of fibers overlying said sleeves,
    (f) means for polymerizing the resin at the next higher station; and
    (g) means at the next higher and last station for severing the formed connecting member into sections containing a plurality of said deformable sleeves to separate each section, together with a section of the supporting mandrel therefor, from the rest of the upwardly moving hollow mandrel.

2. An apparatus as set forth in claim 1, including means for stripping the hollow mandrel from the severed section of the cylindrical connecting member, means for cutting each of said severed sections into double-hoods between said deformable sleeves, and means for deforming the sleeve on the interior of each double-hood to effect the withdrawal thereof.

3. An apparatus as set forth in claim 1 wherein said hollow cylindrical mandrel is composed of a plurality of mandrel sections interconnected together by coupling members on the interior of the mandrel between adjacent sections.

4. An apparatus as set forth in claim 3 wherein the severance of the formed connecting member at the last station coincides with the junction line between two mandrel sections, and means for stripping the hollow mandrel from the severed section and connecting said section to the bottom end of the hollow mandrel below said lowermost station by means of one of said coupling members.

5. An apparatus as set forth in claim 4 wherein said means at the lowermost station comprises a plurality of spools of glass fibers, means for feeding said fibers through a supply of impregnating resin wherefrom the fibers are led through combs and rings in their passage to the outer wall of said mandrel.

6. An apparatus as set forth in claim 5 wherein said means at the second station comprises a rotary platform with a supply of resin-impregnated glass fibers thereon, and means for rotating said platform at a plurality of speeds and simultaneously reciprocating said platform vertically to lay up a large number of turns on said mandrel and elongate fibers on the portions of the mandrel between said sleeves and a lesser number of turns on the sleeves themselves.

7. An apparatus as set forth in claim 6 including means between said first and second stations for confining the elongate fibers on the lateral surfaces of the mandrel.

8. An apparatus as set forth in claim 7 wherein said confining means comprises a mechanism for tying said elongate fibers into said mandrel adjacent to the ends of the deformable sleeves.

9. An apparatus as set forth in claim 6 wherein the means for advancing the mandrel upwardly comprises a plurality of feed rolls in advance of the last station.

10. An apparatus as set forth in claim 9 wherein the means at the last station comprises a horizontal rotary table surrounding said mandrel, a horizontal rotary cutter with actuating means therefor, a support for said cutter and actuating means on said rotary table, and means for moving said support horizontally towards said mandrel to sever the formed body of hardened resin and fibers, and simultaneously moving said support upwardly at a speed coincident with the upward travel of the mandrel, and means for lowering said support at the conclusion of the cutting operation.

11. An apparatus as set forth in claim 10 including means for disengaging said cutter from the formed body at the end of the cutting operation and means for lowering said support at a faster rate than the upward movement thereof preparatory to the execution of the next cutting operation.

12. An apparatus for applying double-hooded cylindrical connecting members directly to electrical disc insulators with heads projecting from the centers thereof towards each other, comprising
    (a) a table for holding the lower insulator with its head projecting upwardly;
    (b) a support for the upper insulator with its head projecting downwardly in coaxial relation with the head of the lower insulator;
    (c) means for disposing a plurality of radially distributed glass fibers between said insulators when said table and support are separated from each other by relative coaxial movement to form a substantially annular curtain of elongate fibers extending in substantial parallelism to the vertical axes of said insulator discs and in surrounding relation to said heads;
    (d) means for compacting said annular curtain of fibers into a bundle of cylindrical form; and
    (e) a rotary table having a supply of glass fibers thereon arranged co-axially with said insulators and provided with vertically reciprocable guide means for applying circumferential bindings around the bundle of elongate fibers and for fastening the opposite ends of the elongate fibers to the external lateral walls of said heads.

13. An apparatus as set forth in claim 12 including means for serving the ends of said cylindrical body of fibers adjacent to the junction of the heads with the insulator discs.

14. An apparatus as set forth in claim 13 including rings of protective material fitted on the junction areas between the insulator discs and the heads projecting therefrom to protect the material of the insulators when the ends of the cylindrical fibers are severed.

15. An apparatus as set forth in claim 13 wherein the severing means comprises a vertical post mounted on said rotary table and provided with a bracket movable on said post, an arm on said bracket movable in a plane transverse to the axis of the insulators and terminating in a cutting member, to selectively bring said cutting member into cutting relation with said bundle of elongate fibers or to withdraw it therefrom.

16. An apparatus as set forth in claim 15 wherein said bracket is moved to the level of the bundle of elongate fibers below the disc of the upper insulator for action of said movable arm and cutting member, and then to the level of the bundle of elongate fibers above the disc of the lower insulator for action of said movable arm and cutting member.

17. An apparatus as set forth in claim 13 including means for impregnating said elongate and circumferential glass fibers with an organic resin and polymerizing said composite mass of resin and fibers.

18. An apparatus as set forth in claim 13 including a mold adapted to be positioned and clamped onto said first table for confining the double-hooded cylindrical connector between said insulator discs for receiving a resin therein to impregnate the glass fibers therewith preparatory to the polymerization thereof.

19. An apparatus as set forth in claim 12 wherein said support is connected to a jack-shaft thereabove and is actuated thereby in a vertical direction, and the table is connected to a shaft therebelow adapted to execute reciprocating movements in a vertical direction.

20. An apparatus as set forth in claim 19 wherein said support includes a centering pin for the base of the insulator disc and a plurality of movable radial fingers for selective engagement and disengagement with the rim of the insulator disc.

21. An apparatus as set forth in claim 12 wherein said fiber disposing means comprises a guiding mechanism for the radially distributed fibers including circular sectors movable in a plane perpendicular to the axis of the insulators at substantially the level of said support.

22. An apparatus as set forth in claim 21, including circular pincers for the fibers beyond said circular sectors.

23. An apparatus as set forth in claim 12 wherein the supply of glass fibers on the rotary table comprises a plurality of spools distributed on said table, and the vertically reciprocable guide means cooperating therewith are actuated at variable speed.

24. An apparatus as set forth in claim 23 including a drive mechanism for said rotary table and guide means which comprises a variable speed motor, and a rack bar actuated thereby through the intermediary of a reversing clutch-brake and a reducer.

25. An apparatus as set forth in claim 24 wherein said rotary table is provided with a hub, a circular gear wheel mounted on said hub, a pinion in mesh with said gear wheel, and a rotary drive shaft carrying said pinion extending in parallel to the axis of said rotary table.

26. An apparatus as set forth in claim 25 including a vertically movable rod guided by said drive shaft, and electrical contact control means thereon for varying the speed of the motor for actuating the thread guide means, whereby the numbers of circumferential windings at different levels of said guide means are varied.

27. An apparatus as set forth in claim 12 wherein a core of insulating material is positioned between the ends of the heads of the insulators facing each other prior to the disposition of the elongate fibers between the insulators and the compacting thereof, so that said core is encompassed within the interior of the annular curtain of fibers and the resulting bundle of elongate fibers of cylindrical form.

28. An apparatus for producing continuously cylindrical rod-like connecting members for electrical insulator assemblies with spaced conically-shaped cores on the interior thereof to form spaced enlargements on the exterior of said connecting members, comprising
(a) means for positioning a core in vertical position having an external inclined surface of revolution,
(b) means for guiding a plurality of resin-impregnated glass fibers towards said core for upward travel therewith in the form of a cylindrical bundle of elongate fibers past a plurality of stations in superposed relation,
(c) means at a second and higher station for compacting said elongate fibers at least at the ends of each core,
(d) means at the next higher station for winding a plurality of turns of resin-impregnated glass fibers around said bundle of elongate fibers at the central portion of each core as well as around said bundle of fibers between said cores,
(e) means for polymerizing the resin at the next higher station, and
(f) means on the next higher and last station for severing the formed connecting member into sections at said central portion of each core from the rest of the upwardly moving rod-like connecting member with the cores incorporated therein.

29. An apparatus as set forth in claim 28 including means for continuously advancing said bundle of elongate fibers upwardly past said plurality of stations.

30. An apparatus as set forth in claim 29 wherein said advancing means comprises a plurality of resiliently mounted feed rolls in advance of the last station in contact with the cylindrical bundle of elongate fibers and capable of yielding to the enlargements on the exterior thereof.

31. An apparatus as set forth in claim 28 wherein said conically-shaped cores have conical end portions at the opposite ends thereof and a neck portion therebetween of smaller cross-section than the bases of the conical end portions.

32. An apparatus as set forth in claim 31 wherein said core-positioning means comprises a temporary support for the successive cores.

33. An apparatus as set forth in claim 32 wherein the core-positioning means comprises a reciprocable pusher rod having a slightly tapered tip for detachably seating a core having a correspondingly slightly tapered central opening.

34. An apparatus as set forth in claim 33 wherein said reciprocable pusher rod is adapted to be lowered to receive the next successive core preparatory to its lifting into position to receive the elongate fibers being guided thereto.

35. An apparatus as set forth in claim 32 wherein said temporary support is a cylindrical rod of insulating material.

36. An apparatus as set forth in claim 32 wherein said temporary support is a cylindrical rod of disposable material.

37. An apparatus as set forth in claim 36 wherein said temporary support is a removable hollow mandrel.

38. An apparatus as set forth in claim 30 wherein said guiding means for the glass fibers comprises a plurality of radially disposed spools of said fibers, means for feeding said fibers through a supply of impregnating resin wherefrom the fibers are led through combs and rings in their passage to the lower end of the lowermost core.

39. An apparatus as set forth in claim 38 wherein said compacting means at the second station comprises a vertically movable assembly to move intermittently in synchronism with the upward travel of the elongate fibers, and including tying means for fastening said elongate fibers together at least adjacent to the ends of the lowermost core.

40. An apparatus as set forth in claim 39 wherein the tying means also fastens the elongate fibers together at the intermediate portion of the lowermost core.

41. An apparatus as set forth in claim 38 wherein the winding means comprises a rotary platform with a supply of resin-impregnated glass fibers thereon, and means for rotating said platform at a plurality of speeds and simultaneously reciprocating said platform vertically to lay up a large number of turns over the elongate fibers at the central part of each core and a lesser number of turns on the elongate fibers between said cores.

42. An apparatus as set forth in claim 41 including means for winding a minimal number of turns at the conical ends of the cores.

43. An apparatus as set forth in claim 41 wherein the severing means at the last station comprises a horizontal rotary table surrounding the cylindrical bundle of elongate fibers containing a plurality of cores, a movable cutter with actuating means therefor, a support for said cutter and actuating means on said rotary table, means for moving said support horizontally to sever the uppermost core at substantially the central portion thereof, means for simultaneously moving said support upwardly at a speed coincident with the upward travel of the cylindrical bundle of fibers with cores therein, and means for withdrawing said cutter and lowering said support at the conclusion of the cutting operation.

44. An apparatus as set forth in claim 43 including a bracket for holding the cylindrical bundle of fibers above the severing means to retain and transfer the severed rod-like connecting member to a distant station following its severance.

References Cited

UNITED STATES PATENTS

| | | | |
|---|---|---|---|
| 3,068,133 | 12/1962 | Cilker et al. | 156—428 XR |
| 3,085,305 | 4/1963 | Colombet et al. | 174—179 XR |
| 3,198,878 | 8/1965 | Kaczerginski | 156—175 XR |
| 3,202,560 | 8/1965 | Michael | 156—425 XR |
| 3,332,815 | 7/1967 | Havens | 156—431 XR |

FOREIGN PATENTS 1,134,947  4/1957  France.

EARL M. BERGERT, Primary Examiner

D. J. FRITSCH, Assistant Examiner

U.S. Cl. X.R.

82—53.1; 156—510; 174—178

PO-1050
(5/69)

UNITED STATES PATENT OFFICE
CERTIFICATE OF CORRECTION

Patent No. 3,468,740  Dated September 23, 1969

Inventor(s) ALEXANDRE KACZERGINSKI

It is certified that error appears in the above-identified patent and that said Letters Patent are hereby corrected as shown below:

The name of the assignee, in the heading of the patent, should be --SOCIETE EUROPEENNE D'ISOLATEURS EN VERRE SEDIVER--.

Column 9, line 18, "widing" should be --winding--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents